United States Patent [19]

Matsuno et al.

[11] 4,258,686
[45] Mar. 31, 1981

[54] COMBUSTION SYSTEM FOR INTERNAL COMBUSTION ENGINES

[75] Inventors: Isao Matsuno, Hachioji; Hisamitsu Yamazoe, Oume, both of Japan

[73] Assignee: Fuji Jukogyo Kabushiki Kaisha, Tokyo, Japan

[21] Appl. No.: 680,032

[22] Filed: Apr. 26, 1976

[30] Foreign Application Priority Data

May 2, 1975 [JP] Japan .................................. 50-53485

[51] Int. Cl.³ ...................... F02B 47/08; F02B 23/00
[52] U.S. Cl. .................................. 123/568; 123/662; 123/671
[58] Field of Search ............... 123/32 B, 32 K, 32 ST, 123/75 B, 119 A

[56] References Cited

U.S. PATENT DOCUMENTS

| | | | |
|---|---|---|---|
| 1,758,242 | 5/1930 | Wehr | 123/191 R |
| 2,199,739 | 5/1940 | Burke | 123/191 R X |
| 2,983,268 | 5/1961 | Heintz | 123/75 B X |
| 3,924,582 | 12/1975 | Yagi et al. | 123/32 ST |
| 3,929,107 | 12/1975 | Renger | 123/32 B |
| 3,941,105 | 3/1976 | Yagi et al. | 123/32 ST |
| 3,945,365 | 3/1976 | Regueino | 123/32 ST |
| 3,968,618 | 9/1975 | Tange | 123/119 A |
| 3,983,858 | 10/1976 | Sevald | 123/191 R |

*Primary Examiner*—Wendell E. Burns
*Attorney, Agent, or Firm*—Martin A. Farber

[57] ABSTRACT

A combustion system for internal combustion engines having an exhaust gas recirculating system which is operable by a lean air-fuel mixture without aggravation of the combustion. The piston of the engine has a sub-piston projecting on the top thereof and the cylinder head is formed with a recess into which the sub-piston is insertable at a position near the top dead center of the stroke of the piston such that the space between the cylinder head and the piston can be divided into two combustion chambers. The compression ratios of both chambers are different from each other. An ignition plug is disposed in the chamber having the lower compression ratio, and ignition of the air-fuel mixture in the chamber having the higher compression ratio takes place by flame from the lower compression ratio chamber as a torch ignition.

5 Claims, 3 Drawing Figures

COMBUSTION SYSTEM FOR INTERNAL COMBUSTION ENGINES

The present invention relates to a combustion system for internal combustion engines and more particularly to a two-stage combustion system for reciprocating piston engines.

There has been proposed a two-stage combustion engine in which the combustion chamber is divided into the first combustion chamber and the second combustion chamber by a sub-piston projecting on the top of the piston at a position near the top dead center of the stroke, and a mixture in the first combustion chamber is firstly ignited and subsequently a mixture in the second combustion chamber is ignited by a flame from the first combustion chamber. In accordance with this system, the combustion condition such as the combustion mass ratio between the first and second combustion chambers and the periods of respective combustions may be controlled to decrease the maximum pressure and temperature in the first combustion to reduce the amount of nitrogen oxides. However, if this system is designed so as to greatly reduce the amount of nitrogen oxides, the combustion speed is decreased, which results in an increase of the fuel consumption, of the amount of hydrocarbons and of the carbon monoxides.

On the other hand, in accordance with the exhaust gas recirculation system, the maximum temperature of combustion is reduced, thereby the amount of nitrogen oxides is decreased. In the exhaust gas recirculation system an air-fuel ratio must be adjusted to a small value, for example, $A/F = 13-15$, for accomplishing the stable combustion. Accordingly, the fuel consumption of the engine is increased greatly as compared with an engine without an exhaust gas recirculation system. In addition, in order to accomplish the combustion in the after treating device such as thermal reactor in order to decrease the amount of hydrocarbon and carbon monoxide in exhaust gases, it is necessary to supply the secondary air into exhaust gases because of the low-air-fuel ratio.

Therefore it is an object of the present invention to remove the above mentioned disadvantages of the conventional combustion systems. Another object of the present invention is to provide a combustion system for internal combustion engines which is capable of accomplishing a stable combustion of lean air-fuel mixture by controlling the combustion speed.

A further object of the present invention is to provide a combustion system for internal combustion engines with low fuel consumption. A still further object of the present invention is to provide a combustion system for internal combustion engines which may decrease the amount of hydrocarbon and carbon monoxide in exhaust gases without introducing the secondary air.

The present invention will be more readily understood by way of example from the following description of an engine in accordance therewith, reference being made to the accompanying drawings in which.

Figure 1:
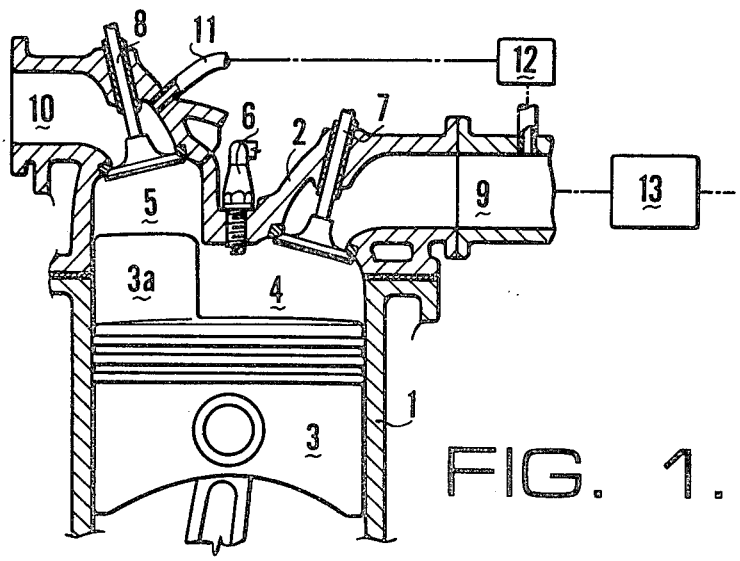
FIG. 1 is a sectional view of a combustion system for an internal combustion engine according to the present invention.

Referring to the drawings, numeral 1 is a cylinder on the top of which a cylinder head 2 is secured, and in the cylinder 1 a piston 3 is slidably provided. On the top of the piston 3, a sub-piston 3a is provided. The cylinder head 2 has a first combustion chamber 4 and a second combustion chamber 5 into which the cylindrical sub-piston 3a may be inserted when the piston 3 reaches the position near the top dead center of the piston stroke. By insertion of the sub-piston 3a into the second combustion chamber 5, the second combustion chamber 5 is separated from the first combustion chamber 4. In the first combustion chamber 4, an ignition plug 6 and an intake valve 7 communicating with an intake port 9 are provided. In the second combustion chamber 5, an exhaust valve 8 communicating with an exhaust port 10 is provided. An exhaust gas recirculation passage 11 is provided between the exhaust port 10 and the intake port 9 to recirculate a part of the exhaust gas into the intake port according to the control of a recirculation control valve 12 in the exhaust gas recirculation passage 11. Further, numeral 13 is a carburetor. The exhaust port 10 is heat-insulated by suitable means and, if necessary, connected to an after treating device, such as a thermal reactor.

The compression ratio in the first combustion chamber is set up to be smaller than the compression ratio in the second combustion chamber 5. The air-fuel mixture introduced from the carburetor 13 through the intake port 9 is a lean air-fuel mixture of which the air-fuel ratio is about $A/F = 16-18$.

In the compression stroke, the compression ratio in the second combustion chamber 5 is larger than the compression ratio in the first combustion chamber 4 at a position near the top dead center so that a part of air-fuel mixture of the second combustion chamber 5 is injected into the first combustion chamber 4 through a gap clearance between the sub-piston 3a and the inner wall of the second chamber 5. Accordingly, a turbulence effect on the air-fuel mixture in the first combustion chamber occurs. Simultaneously, the ignition plug 6 is energized and the air-fuel mixture is rapidly burned. The rapid combustion and turbulence flow in the first chamber bring about the stable combustion of the fuel, although the fuel is a lean mixture and is mixed with the recirculated exhaust gases.

When the sub-piston 3a is separated from the second combustion chamber 5, the flame in the first combustion chamber 4 extends into the second combustion chamber 5 so that the air-fuel mixture in the second combustion chamber 5 is ignited as a torch ignition. The combustion in the second combustion chamber rapidly takes place because of the torch ignition. Thus, the lean mixture may be burned although including recirculated exhaust gas. The combustion speed can be controlled by the amount of recirculated gases so as not to generate the abnormal high speed combustion. According to the driving condition, the recirculation rate is decided, for example, 5–15% is preferable.

The above described two-stage combustion may take place at a low peak temperature, thereby the nitrogen oxides may be remarkably decreased. Further, fuel consumption can be lowered by using a lean mixture without aggravation of the combustion. Also because of the lean mixture, the amount of carbon monoxide and hydrocarbon can be reduced. Further, since the exhaust gas of the lean mixture ordinarily includes 3–5% of oxygen, oxidation of hydrocarbon and carbon monoxide in the after-treating device can take place without the supply of the secondary air as by air pump.

Figure 2:
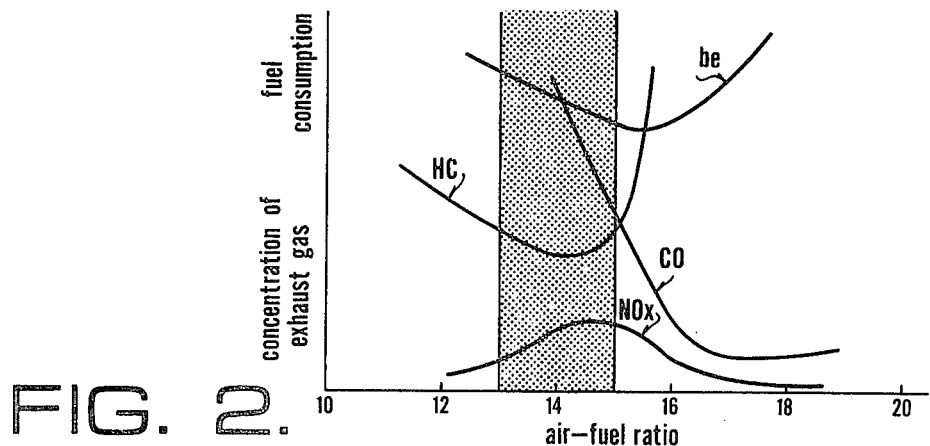
FIG. 2 is a graph showing the relation between the fuel consumption and the concentration of poisonous constituents in exhaust gases and the air-fuel ratio in the conventional combustion system.

In this connection, FIG. 2 shows fuel consumption and the relation between the concentration of nitrogen oxides, carbon monoxide and hydrocarbon and air-fuel ratio in a conventional engine.

Figure 3:
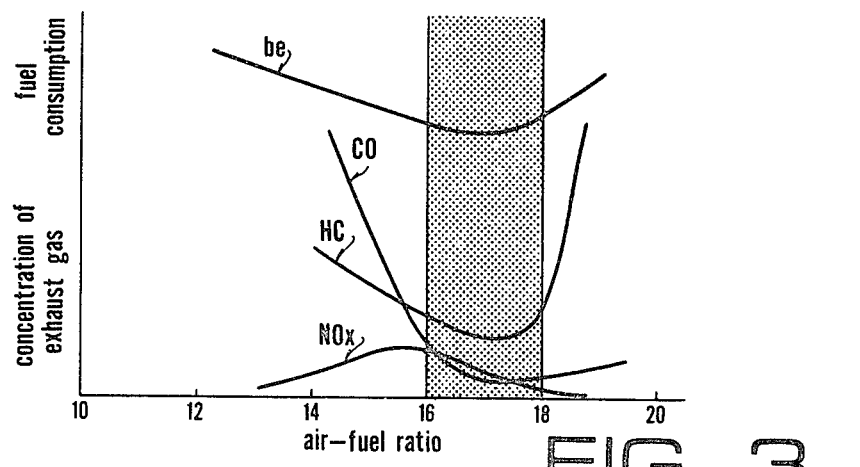
FIG. 3 is a graph showing the relation between the fuel consumption and the concentration of poisonous constituents and the air-fuel ratio in the system of the present invention.

The rotational speed of the engine is 2000 r.p.m., a charging efficiency is 0.5, and the recirculation ratio is about 13%. To the contrary, FIG. 3 shows the relation between the air-fuel ratio and prescribed factors of the engine of the present invention under same conditions as the conventional engine of the FIG. 2. As apparent from the graphs, the two-stage combustion system of the present invention may accomplish the reduction of the amount of nitrogen oxides without increasing the amount of hydrocarbon and carbon monoxide by using a lean air-fuel mixture (A/F=16–18) and may prevent the decrease of output of the engine.

What is claimed is:

1. A method for combustion in internal combustion engines of a lean air-fuel mixture with exhaust gas recirculation in a dividable combustion space between a cylinder head and a stroke reciprocating piston with a sub-piston projecting therefrom, the latter insertable into a recess formed in the cylinder head for dividing the combustion space when the piston reaches a position near the top dead center of the piston stroke into a first combustion chamber and a second combustion chamber, comprising the steps of supplying a lean air-fuel mixture to the combustion space, recirculating a portion of exhaust gases from the combustion space into the lean air-fuel mixture to be supplied to the combustion space, inserting the sub-piston into the recess dividing the combustion space into the first combustion chamber and the second combustion chamber yet with a clearance therebetween at a beginning of the division of the combustion space into the first and second combustion chambers with a higher compression ratio in the second combustion chamber and a lower compression ratio in the first combustion chamber at a position near the top dead center of the stroke of the piston, injecting a part of the mixture in the second combustion chamber through the clearance into the first combustion chamber by the effect of the higher compression ratio in the second combustion chamber during the beginning of the division of the combustion space into the first and second combustion chambers causing a turbulence flow of air-fuel mixture into the first combustion chamber having the lower compression ratio and simultaneously igniting the mixture in the first combustion chamber, subsequently separating and openly communicating the first and second combustion chambers by a downward expansion stroke of the piston withdrawing the sub-piston from the recess causing flame in the first combustion chamber to now for the first time propagate into the region of the second combustion chamber by torch ignition to then first ignite the mixture in the second combustion chamber, thereby to perform a two-stage combustion in the first and second combustion chambers, respectively.

2. The method as set forth in claim 1, wherein the second combustion space is formed in the recess above the sub-piston.

3. The method as set forth in claim 1, further comprising the step of controlling the amount of the recirculated exhaust gases, whereby the combustion speed is regulated.

4. A combustion system for internal combustion engines, comprising a cylinder, a piston reciprocatingly disposed in said cylinder undergoing a stroke movement.

a sub-piston projecting from a top of said piston, said sub-piston having a side wall, a cylinder head secured to a top of said cylinder defining a space between said cylinder head and top surface of said piston and sub-piston, and said cylinder head having an inner wall defining a recess into which said sub-piston is insertable at a position near top dead center of the stroke of said piston so that the space between said cylinder head and said top surfaces of said piston and sub-piston is dividable into a first combustion chamber on top of said piston and a second combustion chamber on top of said sub-piston, respectively, with a clearance being defined between said side wall of said sub-piston and said inner wall of said recess, each of said first and second combustion chambers having a different compression ratio from each other, p1 an ignition plug means provided in one of said combustion chambers having a lower compression ratio for being energized after said sub-piston has engaged in said recess, said first combustion chamber and said clearance between said side wall of said sub-piston and said inner wall of said recess being cooperatively formed such that a part of air-fuel mixture compressed in the other of said combustion chambers having a higher compression ratio injects into said one combustion chamber having the lower compression ratio at a beginning of the division period of said space into said first and second combustion chambers to effect turbulence in said one combustion chamber.

an intake passage opening into either of said combustion chambers, an exhaust passage opening into either of said combustion chambers, an exhaust gas recirculation passage communicating said exhaust passage to said intake passage, a carburetor means for supplying a lean air-fuel mixture to said intake passage, whereby mixture in the other of said combustion chambers having the higher compression ratio is injected into said one combustion chamber having the lower compression ratio at the beginning of the division period which causes a turbulence flow of the air-fuel mixture in said one combustion chamber having the lower compression ratio, whereby the lean air-fuel mixture may be surely ignited, and the mixture in said other combustion chamber having the higher compression ratio may subsequently be ignited as torch ignition by flame injected from said one combustion chamber having the lower compression ratio when said sub-piston is separated from said recess thereby to perform a two-stage combustion, said inner wall and said side wall of said sub-piston define said clearance when said sub-piston is inserted in said recess at the beginning of the division period, the part of said mixture in said other combustion chamber is injected into said one combustion chamber and through said clearance, and said first and second combustion chambers are completely separated and openly communicate in an expansion stroke of said piston when said sub-piston is withdrawn from said recess for the subsequent torch ignition, the latter constituting the second stage of the two-stage combustion, 5. The combustion system for internal combustion engines in accordance with claim 4 in which said second combustion chamber is constructed to have the higher compression ratio and said first combustion chamber is formed to have the lower compression ratio.

* * * * *